United States Patent Office 3,717,653
Patented Feb. 20, 1973

3,717,653
TRIAZOLOBENZODIAZEPINES AND THEIR PRODUCTION
Jackson B. Hester, Jr., Galesburg, Mich., assignor to The Upjohn Company, Kalamazoo, Mich.
No Drawing. Filed Sept. 8, 1971, Ser. No. 178,789
Int. Cl. C07d 57/00
U.S. Cl. 260—308 D    7 Claims

ABSTRACT OF THE DISCLOSURE

6 - phenyl - 4H - tetrazolo[1,5-a][1,4]benzodiazepines of the Formula II

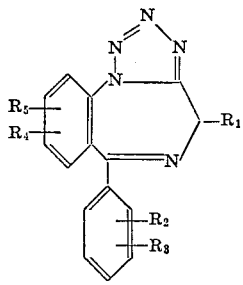

II wherein $R_1$ is hydrogen or alkyl of 1 to 3 carbon atoms, inclusive; wherein $R_2$, $R_3$, $R_4$ and $R_5$ are selected from the group consisting of hydrogen, alkyl as defined above, halogen, nitro, cyano, trifluoromethyl, and alkylthio in which the alkyl group is defined as above, are prepared by reacting a 2-hydrazino-5-phenyl-3H-1,4-benzodiazepine of the Formula I

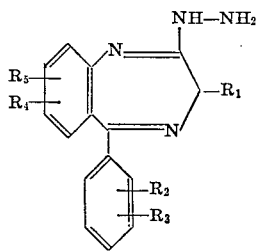

I with nitrous acid.

The compounds of Formula II and the pharmacologically acceptable acid addition salts thereof are useful sedatives and tranquilizers for mammals.

BACKGROUND OF THE INVENTION

Field of the invention

This invention is directed to a new process for organic compounds and is particularly concerned with 6-phenyl-4H-tetrazolo[1,5-a][1,4]benzodiazepines and a process therefor.

The novel compounds and the process of production therefore can be illustratively represented as follows:

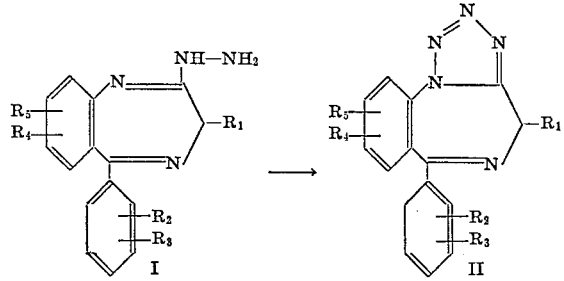

wherein $R_1$ is selected from the group consisting of hydrogen and alkyl of 1 to 3 carbon atoms, inclusive; and wherein $R_2$, $R_3$, $R_4$, and $R_5$ are selected from the group consisting of hydrogen, alkyl as defined above, halogen, nitro, cyano, trifluoromethyl, and alkylthio in which alkyl is defined as above.

The invention includes also the pharmacologically acceptable acid addition salts thereof.

The process of this invention comprises treating a 2-hydrazinobenzodiazepine I with nitrous acid to obtain the 6 - phenyl - 4H-tetrazolo[1,5-a][1,4], benzodiazepine II. The nitrous acid used in the reaction is produced in situ, e.g. by reacting a nitrite e.g. sodium, potassium, or calcium nitrite with a dilute mineral acid, e.g. hydrochloric, sulfuric, hydrobromic, phosphoric, or fluoroboric acid.

DESCRIPTION OF THE PREFERRED EMBODIMENT

Lower alkyl groups of 1 to 3 carbon atoms, inclusive, are exemplified by methyl, ethyl, propyl, and isopropyl.

Alkylthio, of 1 to 3 carbon atoms, inclusive, is defined as having a lower-alkyl of 1 to 3 carbon atoms, inclusive, as above.

The term halogen includes fluorine, chlorine, and bromine.

The novel compounds of the Formula II including acid addition salts thereof have sedative, tranquilizing and muscle relaxant effects in mammals and birds.

The acid addition salts of compounds of Formula II contemplated in this invention, are the hydrochlorides, hydrobromides, hydroiodides, sulfates, phosphates, cyclohexanesulfamates, methanesulfonates, and the like, prepared by reacting a compound of Formula II with the stoichiometrically calculated amount of the selected pharmacologically acceptable acid.

Sedative effects of 8-chloro-6-phenyl-4H-tetrazolo[1,5-a][1,4]benzodiazepine are shown by the following tests in mice:

Chimney test: [Med. Exp. 4, 145 (1961)]: The effective intraperitoneal dosage for 50% of mice ($ED_{50}$) is 18 mg./kg. The test determines the ability of mice to back up and out of a vertical glass cylinder within 30 seconds. At the effective dosage, 50% of the mice failed doing it.

Dish test: Mice in Petri dishes (10 cm. diameter, 5 cm. high, partially embedded in wood shavings), climb out in a very short time, when not treated. Mice remaining in the dish for more than 3 minutes indicates tranquilization. $ED_{50}$ equals the dose of test compound at which 50% of the mice remain in the dish. The $ED_{50}$ (intraperitoneal administration) in this test was 32 mg./kg.

Pedestal test: The untreated mouse leaves the pedestal in less than a minute to climb back to the floor of the standard mouse box. Tranquilized mice will stay on the pedestal for more than 1 minute. The $ED_{50}$ (intraperitoneal administration) is 40 mg./kg.

Nicotine antagonism test: Mice in a group of 6 are injected with the test compound (8-chloro-6-phenyl-4H-tetrazolo[1,5 - a][1,4]benzodiazepine). Thirty minutes later the mice including control (untreated) mice are injected with nicotine salicylate (2 mg./kg.). The control mice show overstimulation, i.e., (1) running convulsions followed by (2) tonic extensor fits; followed by (3) death. An intraperitoneal dosage of 6.3 mg./kg. of the test compound protected 50% of the mice against (2) and (3).

The pharmaceutical forms contemplated by this invention include pharmaceutical compositions suited for oral, parenteral and rectal use, e.g., tablets, powder packets, cachets, dragees, capsules, solutions, suspensions, sterile injectable forms, suppositories, bougies, and the like. Suitable diluents or carriers such as carbohydrates (lactose), proteins, lipids, calcium phosphate, cornstarch, stearic acid, methylcellulose and the like may be used as carriers or for coating purposes. Oil, e.g., coconut oil, sesame oil, safflower oil, cottonseed oil, peanut oil may be used for preparing solutions or suspensions of the active drug. Sweetening, coloring, and flavoring agents may be added.

For mammals and birds, food premixes, with starch, oatmeal, dried fishmeat, fishmeal, flour and the like can be prepared to increase weight or provide a higher food efficiency, greater milk or egg production.

As tranquilizers, the compounds of Formula I can be used in dosages of 2–100 mg./kg. in oral, rectal or injectable preparations as described above, to alleviate tension and anxiety in mammals, or birds, such as e.g., occurs when animals are in travel.

As feed additives to increase weight and feed efficiency or milk and egg production a quantity of 5–200 g. per ton of feed is fed to livestock or poultry.

The starting materials, hydrazines of Formula I are known e.g. Netherlands Patent application (laid open) 69/16543 or can be synthetized as shown in Preparation 1.

In carrying out the process of the present invention, a 2-hydrazino-5-phenyl-3H-1,4-benzodiazepine I is treated with an aqueous acid at temperatures between —10° and 10° C. As acids, aqueous mineral acids are preferred such as dilute aqueous hydrochloric, hydrobromic, sulfuric acids and the like. However, acetic or propionic acids are also useful. To this cold solution an aqueous solution of a nitrite salt is added e.g. sodium, potassium, calcium nitrite, and the like are used, with alkali nitrates preferred. Temperatures between —5 to 10° are preferred for this reaction. The reaction period is from 1 to 20 minutes of which the first 10 minutes are preferably used to complete the addition of the nitrite solution to the reaction mixture. At the termination of the reaction the product, a 6-phenyl-4H-tetrazolo[1,5-a][1,4]benzodiazepine is isolated and purified by conventional procedures, such as extraction, crystallization, chromatography or the like.

The following examples are illustrative of the processes and products of the present invention, but are not to be construed as limiting.

Preparation 1.—7-chloro-5-phenyl-3H-1,4-benzodiazepin-2-yl hydrazine

A stirred mixture of 7-chloro-1,3-dihydro-5-phenyl-2H-1,4-benzodiazepine-2-thione (50 g., 0.175 mole) and methanol (1700 ml.) was treated with hydrazine hydrate (34.9 g.) and allowed to remain at ambient temperature for 1 hour 45 minutes. A slow stream of nitrogen was bubbled through the mixture during this period. The resulting solution was concentrated in vacuo at 25–30° C. The residue was mixed with water and extracted with chloroform. The extract was dried over anhydrous potassium carbonate and concentrated under reduced pressure on the rotary evaporator in such a manner that the chloroform was replaced by ethyl acetate. The resulting mixture was crystallized at 4° C. to give 26.6 g. of melting point 184–186° and 3.04 g. of melting point 204–211° of 7-chloro - 5 - phenyl-3H-1,4-benzodiazepin-2-yl hydrazine. This compound decomposes on heating in solvents to an unknown product of melting point 261–262° C. The melting point discrepancy may be due to the partial thermal conversion of the hydrazine to this material. The analytical sample was crystallized from ethyl acetate and had a melting point of 217.5–219° C.

*Analysis.*—Calcd. for $C_{15}H_{13}ClN_4$ (percent): C, 63.27; H, 4.60; Cl, 12.45; N, 19.68. Found (percent): C, 63.30; H, 4.52; Cl, 12.46; N, 18.86.

In the manner given in Preparation 1, other 5-phenyl-3H-1,4-benzodiazepin-2-yl hydrazines can be produced by reacting a selected 1,3-dihydro-5-phenyl-2H-1,4-benzodiazepin-2-thione with hydrazine or hydrazine hydrate. Representative starting compounds thus prepared include:

7-bromo-5-phenyl-3H-1,4-benzodiazepin-2-yl hydrazine;
7-fluoro-5-phenyl-3H-1,4-benzodiazepin-2-yl hydrazine;
7-chloro-5-(o-chlorophenyl)-3H-1,4-benzodiazepin-2-yl hydrazine;
7-trifluoro-5-(o-chlorophenyl)-3H-1,4-benzodiazepin-2-yl hydrazine;
7-chloro-5-(2,6-dichlorophenyl)-3H-1,4-benzodiazepin-2-yl hydrazine;
7-nitro-5-(o-chlorophenyl)-3H-1,4-benzodiazepin-2-yl hydrazine;
9-nitro-5-(2,6-difluorophenyl)-3H-1,4-benzodiazepin-2-yl hydrazine;
8-propyl-5-(m-nitrophenyl)-3H-1,4-benzodiazepin-2-yl hydrazine;
9-isopropyl-5-(o-cyanophenyl)-3H-1,4-benzodiazepin-2-yl hydrazine;
7-methyl-5-(2,4-diethylphenyl)-3H-1,4-benzodiazepin-2-yl hydrazine;
6-ethyl-5-(m-trifluoromethylphenyl)-3H-1,4-benzodiazepin-2-yl hydrazine;
6,8-dicyano-5-(p-isopropylphenyl)-3H-1,4-benzodiazepin-2-yl hydrazine;
5-(o-chlorophenyl)-3H-1,4-benzodiazepin-2-yl hydrazine;
3,7-dimethyl-5-(o-chlorophenyl)-3H-1,4-benzodiazepin-2-yl hydrazine;
3-ethyl-9-trifluoromethyl-5-phenyl-3H-1,4-benzodiazepin-2-yl hydrazine;
and the like.

EXAMPLE 1

8-chloro-6-phenyl-4H-tetrazolo[1,5-a][1,4]benzodiazepine 7-chloro-5-phenyl-3H-1,4-benzodiazepin-2-yl hydrazine (2.00 g., 7.02 mmoles) was added with stirring to an ice cold 2 N solution of hydrochloric acid (20 ml.). The resulting reddish suspension was cooled to —5° C. and treated during 10 minutes with a solution of sodium nitrite (0.509 g., 7.37 mmoles) in water (2.5 ml.). The temperature of the reaction mixture was maintained at —5° to 2° during the addition. The mixture became thick. It was stirred for an additional 6 minutes, poured into ice water and made alkaline with sodium hydroxide. The solid was collected by filtration, washed with water, dissolved in methylene chloride, washed with water, dried over anhydrous potassium carbonate and crystallized from methylene chloride-ethyl acetate to give 1.66 g. (80%) of 8-chloro-6-phenyl-4H-tetrazolo[1,5-a][1,4]benzodiazepine of melting point 178.5–180° C. (decomposition). The analytical sample had a melting point of 181–182° C.

*Analysis.*—Calcd. for $C_{15}H_{10}ClN_5$ (percent): C, 60.92; H, 3.41; Cl, 11.99; N, 23.68. Found (percent): C, 60.86; H, 3.67; Cl, 12.01; N, 23.90.

EXAMPLE 2

8-chloro-6-(o-chlorophenyl)-4H-tetrazolo[1,5-a][1,4]benzodiazepine

In the manner given in Example 1, 7-chloro-5-(o-chlorophenyl) - 3H - 1,4 - benzodiazepin-2-yl hydrazine was treated wth aqueous hydrochloric acid and then with an aqueous solution of sodium nitrite to give 8-chloro-6-(o-chlorophenyl) - 4H - tetrazolo[1,5-a][1,4]benzodiazepine.

EXAMPLE 3

8-chloro-6-(2,6-difluorophenyl)-4H-tetrazolo[1,5-a][1,4]benzodiazepine

In the manner given in Example 1, 7-chloro-5-(2,6-difluorophenyl)-3H-1,4-benzodiazepin-2-yl hydrazine was treated with aqueous hydrochloric acid and then with an aqueous solution of potassium nitrite to give 8-chloro-6-(2,6-difluorophenyl)-4H-tetrazolo[1,5-a][1,4]benzodiazepine.

EXAMPLE 4

8-propyl-6-(m-nitrophenyl)-4H-tetrazolo[1,5-a]-[1,4]benzodiazepine

In the manner given in Example 1, 7-propyl-5-(m-nitrophenyl)-3H-1,4-benzodiazepin-2-yl hydrazine was treated with aqueous hydrobromic acid and then with an aqueous solution of sodium nitrite to give 8-propyl-6-(m-nitrophenyl)-4H-tetrazolo[1,5-a][1,4]benzodiazepine.

EXAMPLE 5

9-isopropyl-6-(o-cyanophenyl)-4H-tetrazolo-[1,5-a][1,4]benzodiazepine

In the manner given in Example 1, 8-isopropyl-5-(o-cyanophenyl) - 3H - 1,4-benzodiazepin-2-yl hydrazine was treated with aqueous sulfuric acid and then with an aqueous solution of potassium nitrite to give 9-isopropyl-6-(o-cyanophenyl)-4H-tetrazolo[1,5-a][1,4]benzodiazepine.

EXAMPLE 6

8-methyl-6-(2,4-diethylphenyl)-4H-tetrazolo-[1,5-a][1,4]benzodiazepine

In the manner given in Example 1, 7-methyl-5-(2,4-diethylphenyl)-3H-1,4-benzodiazepin-2-yl hydrazine was treated with aqueous hydrochloric acid and then with an aqueous solution of sodium nitrite to give 8-methyl-6-(2,4 - diethylphenyl) - 4H - tetrazolo[1,5-a][1,4]benzodiazepine.

EXAMPLE 7

7-ethyl-6-(m-trifluoromethylphenyl)-4H-tetrazolo-[1,5-a][1,4]benzodiazepine

In the manner given in Example 1, 6-ethyl-5-(m-trifluoromethylphenyl) - 3H - 1,4 - benzodiazepin-2-yl hydrazine was treated with aqueous hydrochloric acid and then with an aqueous solution of sodium nitrite to give 7 - ethyl - 6 - (m-trifluoromethylphenyl)-4H-tetrazolo-[1,5-a][1,4]benzodiazepine.

EXAMPLE 8

7,9-dicyano-6-(p-isopropylphenyl)-4H-tetrazolo-[1,5-a][1,4]benzodiazepine

In the manner given in Example 1, 6,8-dicyano-5-(p-isopropylphenyl) - 3H - 1,4-benzodiazepin-2-yl hydrazine was treated with aqueous hydrochloric acid and then with an aqueous solution of potassium nitrite to give 7,9-dicyano - 6-(p-isopropylphenyl)-4H-tetrazolo[1,5-a][1,4]benzodiazepine.

EXAMPLE 9

6-(o-chlorophenyl)-4H-tetrazolo[1,5-a][1,4]-benzodiazepine

In the manner given in Example 1, 5-(o-chlorophenyl)-3H-1,4-benzodiazepin-2-yl hydrazine was treated with acetic acid and then with an aqueous solution of calcium nitrite to give 6-(o-chlorophenyl)-4H-tetrazolo[1,5-a]-[1,4]benzodiazepine.

EXAMPLE 10

4,7-dimethyl-6-(o-chlorophenyl)-4H-tetrazolo-[1,5-a][1,4]benzodiazepine

In the manner given in Example 1, 3,6-dimethyl-5-(o-chlorophenyl)-3H-1,4-benzodiazepin-2-yl hydrazine was treated with aqueous hydrochloric acid and then with an aqueous solution of potassium nitrite to give 4,7-dimethyl-6 - (o - chlorophenyl) - 4H-tetrazolo[1,5-a][1,4]benzodiazepine.

In the same manner given in Example 1 other 6-phenyl-4H-tetrazolo[1,5-a][1,4]benzodiazepines of Formula II can be produced by reacting a 5-phenyl-3H-1,4-benzodiazepin-2-yl hydrazine with nitrous acid. Representative compounds thus-produced comprise:

8-bromo-6-phenyl-4H-tetrazolo[1,5-a][1,4]benzodiazepine;
9-bromo-6-(m-chlorophenyl)-4H-tetrazolo-[1,5-a][1,4]benzodiazepine;
7-chloro-6-(2,6-dichlorophenyl)-4H-tetrazolo-[1,5-a][1,4]benzodiazepine;
8-nitro-6-(o-nitrophenyl)-4H-tetrazolo[1,5-a][1,4]-benzodiazepine;
4-ethyl-9-trifluoromethyl-6-phenyl-4H-tetrazolo-[1,5-a][1,4]benzodiazepine;
4-isopropyl-8-nitro-6-(m-nitrophenyl)-4H-tetrazolo-[1,5-a][1,4]benzodiazepine;
4,7,8-trimethyl-6-(2,6-dipropylphenyl)-4H-tetrazolo-[1,5-a][1,4]benzodiazepine;
7,8-dicyano-6-(o-cyanophenyl)-4H-tetrazolo-[1,5-a][1,4]benzodiazepine;
7,9-dicyano-6-(o-bromophenyl)-4H-tetrazolo-[1,5-a][1,4]benzodiazepine;
7,8-difluoro-6-(o-fluorophenyl)-4H-tetrazolo-[1,5][1,4]benzodiazepine;
8-isopropyl-6-(2,6-dimethylphenyl)-4H-tetrazolo-[1,5-a][1,4]benzodiazepine;
9-methyl-6-(p-trifluoromethylphenyl)-4H-tetrazolo-[1,5-a][1,4]benzodiazepine;

and the like.

Treating the compounds of Formula II with pharmacologically acceptable acids such as hydrochloric, hydrobromic, phosphoric, sulfuric, acetic, propionic, toluenesulfonic, methanesulfonic, tartaric, citric, lactic, malic, maleic, or cyclohexanesulfamic acid produces the corresponding pharmacologically acceptable salts of the compounds of Formula II which can be used like the free base compounds of Formula II. Salt formation is achieved in conventional manner by reacting the compounds of Formula II with excess of a selected acid in a suitable medium e.g. water, a lower alkanol, ether, or acetone and recovering the salt by evaporating the solvent, preferably in vacuo.

I claim:

1. A compound selected from the group consisting of 6 - phenyl - 4H - tetrazolo[1,5-a][1,4]benzodiazepines of the Formula II

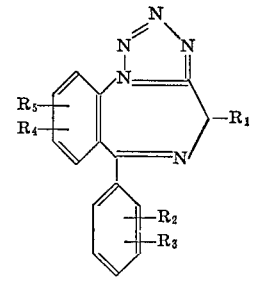

II wherein $R_1$ is selected from the group consisting of hydrogen and alkyl of 1 to 3 carbon atoms, inclusive; and wherein $R_2$, $R_3$, $R_4$, and $R_5$ are selected from the group consisting of hydrogen, alkyl as defined above, halogen, nitro, cyano, trifluoromethyl, and adkylthio in which alkyl is defined as above, and the pharmacologically acceptable acid addition salts thereof.

2. The compound of claim 1 wherein $R_1$, $R_2$, $R_3$, and $R_5$ are hydrogen and $R_4$ is 8-chloro, so that the compound is 8 - chloro - 6 - phenyl - 4H - tetrazolo[1,5-a][1,4] benzodiazepine.

3. The compound of claim 1 wherein $R_1$, $R_3$, and $R_5$ are hydrogen, $R_2$ is o-chloro and $R_4$ is 8-chloro, so that the compound is 8-chloro-6-(o-chlorophenyl)-4H-tetrazolo[1,5-a][1,4]benzodiazepine.

4. A process for the production of a compound selected from the group consisting of 6-phenyl-4H-tetrazolo[1,5-a][1,4]benzodiazepines of the formula II:

wherein $R_1$ is selected from the group consisting of hydrogen and alkyl of 1 to 3 carbon atoms, inclusive; and wherein $R_2$, $R_3$, $R_4$, and $R_5$ are selected from the group consisting of hydrogen, alkyl as defined above, halogen, nitro, cyano, trifluoromethyl, and alkylthio in which alkyl is defined as above, which comprises: treating a compound of Formula I

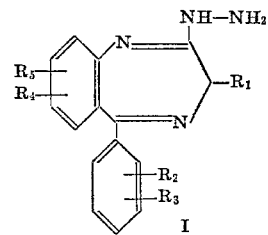

wherein $R_1$, $R_2$, $R_3$, $R_4$, and $R_5$ are defined as above, with nitrous acid to obtain the compound II of above.

5. The process of claim 4 wherein the nitrous acid is produced in situ by an alkali nitrite and a dilute acid.

6. The process of claims 4 and 5 wherein the nitrous acid is produced by the reaction of hydrochloric acid and sodium nitrite.

7. The process of claim 4 wherein the starting material is 7 - chloro - 5-phenyl-3H-1,4-benzodiazepine-2-yl hydrazine.

References Cited
FOREIGN PATENTS
6,916,543    5/1970    Netherlands _____ 260—308 R ALTON D. ROLLINS, Primary Examiner U.S. Cl. X.R.

99—2 G, 2 T; 260—239 BD, 239.3 D; 424—185, 269